United States Patent [19]

Kamimura et al.

[11] Patent Number: 4,778,653

[45] Date of Patent: Oct. 18, 1988

[54] METHOD FOR PREVENTING BIOFOULING OF SURFACES IN CONTACT WITH SEA WATER

[75] Inventors: Kazuo Kamimura; Michio Araki, both of Kure, Japan

[73] Assignee: Agency of Industrial Science and Technology, Tokyo, Japan

[21] Appl. No.: 157,098

[22] Filed: Feb. 9, 1988

Related U.S. Application Data

[63] Continuation of Ser. No. 42,598, Apr. 14, 1987, abandoned, which is a continuation of Ser. No. 694,667, Jan. 24, 1985, abandoned.

[30] Foreign Application Priority Data

Jan. 30, 1984 [JP] Japan ................................ 59-16388

[51] Int. Cl.4 ............................................. B08F 17/00
[52] U.S. Cl. ........................................ 422/6; 210/764; 422/7; 422/28; 435/264; 435/800; 435/948
[58] Field of Search ...................... 210/764, 698, 631; 435/264, 800, 948; 422/6, 7, 28

[56] References Cited

U.S. PATENT DOCUMENTS

| | | | |
|---|---|---|---|
| 4,055,467 | 10/1977 | Christensen et al. | 435/264 |
| 4,133,862 | 1/1979 | Bultman et al. | 422/28 |
| 4,253,951 | 3/1981 | McCune | 210/631 |
| 4,255,383 | 3/1981 | Schenck | 210/764 |
| 4,257,459 | 3/1981 | Jenks | 138/147 |
| 4,258,090 | 3/1981 | Moraru | 427/386 |
| 4,561,981 | 12/1985 | Characklis | 422/7 |

*Primary Examiner*—Michael S. Marcus
*Attorney, Agent, or Firm*—Wyatt, Gerber, Burke and Badie

[57] ABSTRACT

The invention provides a novel and efficient method for preventing biofouling on the surface of a solid body continuously in contact with bacteria-containing sea water, such as the heat transfer surface in a heat exchanger using sea water as the cooling medium, caused by the attachment of the proliferated bacteria. The method comprises adding bacteriophages capable of lysing the bacteria responsible for the biofouling of the surface to the sea water brought into contact with the surface so that the sea water can be efficiently and inexpensively sterilized prior to contacting with the surface not to cause biofouling absolutely without the problem of environmental pollution.

2 Claims, No Drawings

METHOD FOR PREVENTING BIOFOULING OF SURFACES IN CONTACT WITH SEA WATER

This is a continuation of Ser. No. 042,598, filed Apr. 14, 1987, now abandoned, which is a continuation of Ser. No. 694,667, filed Jan. 24, 1985, now abandoned.

BACKGROUND OF THE INVENTION

The present invention relates to a method for preventing biofouling of surfaces continuously in contact with sea water or, more particularly, to a method for preventing the microbiofouling film formed by the proliferation of bacteria in the sea water on the surface of various facilities continously in contact with sea water to cause drawbacks such as decrease in the heat transfer coefficient through the surface.

As is well known, sea water is utilized in large volumes mainly as a cooling medium or with an object of heat recovery in heat exchangers in various facilities such as power stations and chemical plants located at seaside as well as in the evaporators of LNG in LNG import bases and engines of vessels. In recent years, intensive development works are under way on the ocean thermal energy conversion system as a new energy source utilizing the temperature difference of sea water between the surface layer and the depth of ocean. In such a system, however, the utilizable temperature difference cannot exceed about 20° C. so that one of the key problems in this technology is how to ensure the highest possible efficiency of heat exchange. This is because the surfaces of heat exchangers continuously in contact with the sea water intake are unavoidably covered with a microbiofouling film formed by the proliferation of microorganisms in the sea water to cause serious decrease in the heat transfer coefficient through the surface.

Of course, various methods have been proposed and are practiced to solve this difficult problem. One of the approaches for the purpose is a chemical means in which the heat transfer surface is periodically sterilized to destroy the adhering biofouling film by use of various anti-fouling chemical substances having toxicity to the fouling microorganisms including, for example, chlorine, bromine, bromine chloride, hydrogen peroxide, ozone, permanganates, arsenates, arsenites, cyano compounds, heavy metal salts, organometallic compounds, phenols and the like. Such a method of using an anti-fouling chemical agent is, however, not quite satisfactory and the applicability of the method is under strict limitations even by setting aside the problem of expensiveness of such a chemical agent because the anti-fouling agents are also toxic to other harmless microorganisms as well as any oceanic living organisms in general to cause a serious problem of environmental disruption.

Alternatively to the above mentioned chemical means, several physical and mechanical methods have been proposed for preventing biofouling of surfaces in sea water including the hot-water treatment method, osmotic impact method, ultraviolet irradiation method, ultrasonic vibration method and mechanical scrubbing method using sponge balls or brushes. Each of these methods, however, is defective in one or more respects and far from satisfactory. For example, the applicability of the method of hot-water treatment is limited to the plant sites where a large volume of hot waste water is available because otherwise the expenses for the facility investment and energy cost for the hot water production are almost prohibitive of the method. The applicability of the osmotic impact method is under limitation by the availability of a large volume of fresh water and also by the disadvantage in the working efficiency that the method can be performed only with interruption of running of heat exchangers and other facilities. Further, the effectiveness of the methods of ultraviolet irradiation and ultrasonic vibration is suddenly decreased as the distance from the ultraviolet or ultrasonic apparatus is increased so that no satisfactory results can be obtained unless a number of such apparatuses are installed with great expenses. The method of mechanical scrubbing requires certain specialty apparatus and can be performed also only with interruption of running of the heat exchangers in addition to the serious problem of possible damages caused on the surface under mechanical scrubbing as well as incompleteness of scrubbing for the removal of the biofouling films especially when the scrubbed surface has a complicated form.

Thus, none of the prior art methods is quite satisfactory for preventing biofouling of surfaces in contact with sea water due to the above described problems and disadvantages encountered in practicing the method so that it has been eagerly desired to develop a novel and improved method for the purpose freed from the problems and disadvantages in the prior art methods.

SUMMARY OF THE INVENTION

An object of the present invention is therefore to provide an efficient method for the prevention of biofouling on a surface continuously in contact with sea water without the problems and disadvantages in the prior art methods.

The method of the present invention for the prevention of biofouling of the solid surface continuously in contact with sea water containing bacteria responsible for the biofouling of the surface comprises:
(a) adding anti-fouling bacteriophages, i.e. bacteriophages capable of lysing the bacteria, to the sea water coming into contact with the surface;
(b) sterilizing the sea water with the proliferation of the anti-fouling bacteriophages; and
(c) bringing the thus sterilized sea water into contact with the surface.

It is further advantageous that at least a part of the bacteriophage-containing sea water after contacting with the surface in the above mentioned step (c) is recycled to the sea water before contacting with the surface so that the sea water brought into contact with the surface is a mixture of fresh sea water after addition of the bacteriophages in the above mentioned step (a) and the recycled bacteriophage-containing sea water.

DETAILED DESCRIPTION OF THE PREFERRED EMBODIMENTS

As is understood from the above description, the method of the present invention is a biological method capable of selectively killing the microorganisms responsible for the biofouling of the surface and inherently free from the problem of adverse influences on other harmless living organisms including microorganisms contributing to the environment reservation by virtue of the absence of accumulation in nature of the anti-fouling agent which itself is a natural entity. Furthermore, the inventive method is very efficient because the anti-fouling effect is obtained even by the addition of a small number of the bacteriophages which can proliferate by the interaction with the fouling bacteria to magnify the anti-fouling efficiency and the method can be performed without interruption of running of any facilities not to cause decrease in the productivity.

The bacteriophages used in the inventive method are also called bacterial viruses and composed of a nucleic acid and protein alone but have no capability of autogenous proliferation. Electronmicroscopic examination of a bacteriophage particle indicates that the particle usually has an appearance composed of a head of a regular eicosahedral configuration having a diameter of 50 to 60 nm and a tail having a length of 12 to 160 nm and provided with a few branched spikes at the end thereof although the tail and/or the spikes cannot be found in some species of bacteriophages. A bacteriophage has a capacity to parasitize specific bacteria to cause lysis thereof. Proliferation of a bacteriophage proceeds according to the process in which the nucleic acid of the bacteriophage adhering to a bacterium is injected into the bacteria cell where synthesis of the protein specific to the bacteriphage and replication of the nucleic acid take place to form a particle of the bacteriophage followed by the lysis of the bacterial cell and release of 20 to 200 bacteriophage particles.

In practicing the method of the invention, detection and collection are performed of the bacteriophages having a lytic activity against the bacteria responsible for the biofouling of the surface in contact with the sea water and the bacteriophages are added to the sea water, for example, at the intake before it is supplied to the heat exchangers and other facilities.

The essential idea of the inventive method consists in the selective sterilization of the bacteria responsible for the biofouling of the surface in contact with the sea water by the addition of the bacteriophages capable of lysing the bacteria present in the sea water. The bacteria in sea water responsible for the biofouling of solid surfaces in contact with the sea water are mainly the gram-negative rod-shaped bacteria such as Pheudomonas, Flavobacterium, Vibrio and the like. The above mentioned bacteriophages each have a capacity of lysing a particular species of these bacteria although some of the phages are effective to lyse several species of the bacteria.

In the method of the invention, it is of course that the bacteriophages added to the sea water should be capable of lysing the bacteria specifically responsible for the biofouling of the surfaces. A guide to the selection of the effective bacteriophage is obtained as follows. Namely, several kinds of solid materials are immersed and kept for 1 to 3 months in the sea water and the bacteria adhering to the surface are isolated. The thus isolated bacteria are cultured in a sea water-based culture medium containing necessary nutrient ingredients and the culture in the culture medium is further continued with addition of the sea water or sea sludge containing the bacteriophages to be tested and obtained usually in the sea area where the bacteria responsible for the biofouling of the surfaces are detected. Thereafter, a few drops of the supernatant are added to an agar inoculated in advance with the bacteria in question and culture is continued overnight. When clear plaques are found on the agar surface, the bacteriophages are isolated from the plaques and used in the inventive method.

The amount of the bacteriophage particles to be added to the sea water should be in the range from $10^4$ to $10^8$ or, preferably, from $10^5$ to $10^7$ in number per liter of the sea water when the sea water contains the bacteria at an ordinary level of, for example, $10^8$ in number per liter. The sterilization of the sea water to which the bacteriophages have been added is complete usually by keeping it for 30 minutes or longer.

When the sea water brought into contact with the surface of a heat exchanger and the like has been sterilized in the above described manner, deposition of the microbiofouling film on the surface can be completely prevented or, at least, greatly reduced.

In addition, bacteriphages are capable of multiplication by the lysis of the attached bacteria with release of an increased number of the same bacteriophages so that the efficiency of the inventive method can be greatly increased and the preventing effect of the biofouling can be continuously obtained when at least a part of the sea water with addition of the bacteriophages and after contacting with the surface is recycled and mixed with fresh sea water to be re-used in this manner.

In the inventive method, appropriate bacteriophages capable of lysing the specific noxious bacteria must be detected by the search throughout the sea area, isolated and cultured to multiply but, once an appropriate species of the bacteriophages has been obtained, any desired amount thereof can be prepared easily by a conventional biological means.

As is understood from the above description, the method of the invention provides an advantageous biological means for selectively eliminating the noxious bacteria responsible for the microbiofouling on the surface with absolutely no adverse influences on the harmless living organisms utilizing the specificity in the lysis by bacteriophages so that the disruption of the environment can be minimized in addition to the advantage of the high efficiency obtained only with a small amount of the bacteriphage addition to the sea water.

In the following, the method of the invention is described in more detail by way of examples. Preliminary Tests.

Plates of a titanium and an aluminum alloy were immersed in sea water in the area about 30 meters offshore of Kurahashi Island, in the Seto Inland Sea, Japan, at a depth of 5 meters from the surface. The bacteria adhering to the surface were collected from the plates and cultured and isolated on a sea water-agar culture medium containing 0.5% by weight of polypeptone, 0.1% by weight of yeast extract and 1.5% by weight of agar. In this manner, 19 species of bacteria were isolated and bacteriologically examined to give the results tabulated in Table 1 below.

TABLE 1

|  | Isolated from Titanium Strain No. | | | | | | | | | |
|---|---|---|---|---|---|---|---|---|---|---|
|  | T-1 | T-2 | T-3 | T-4 | T-5 | T-6 | T-7 | T-8 | T-9 | T-10 |
| Cell form | R | R | R | R | R | R | R | R | R | R |
| Gram's stain | — | — | — | — | — | — | — | — | — | — |
| Flagellation | Po | Po | Po | — | Po | Po | Po | Po | Po | Po |
| H.L. test | O | NA | NA | NA | NA | F | F | NA | F | F |
| Sensitivity to 0/129 | — | — | — | — | — | + | + | — | + | + |

TABLE 1-continued

| Pigmentation | | | | | Y | | | | | |
|---|---|---|---|---|---|---|---|---|---|---|
| Catalase | + | + | + | + | + | + | + | + | + | + |
| Oxidase | + | + | + | − | + | + | + | + | + | + |
| Indole production | − | − | − | − | − | + | + | − | + | + |
| H S production | + | − | + | + | − | + | + | + | − | − |
| M.R. test | − | − | − | − | − | − | − | − | − | − |
| V.P. test | − | − | − | − | − | + | + | − | + | − |
| Growth in 7.5% NaCl | + | + | + | + | + | + | + | + | + | + |
| Require added NaCl | + | + | + | + | + | + | + | + | + | + |
| Growth at 37° C. | − | + | + | − | + | + | + | − | + | + |
| Identification | Ps | Ps | Ps | F | Ps | V | V | Ps | V | V |

| | Isolated from Aluminum alloy Strain No. | | | | | | | | |
|---|---|---|---|---|---|---|---|---|---|
| | A-1 | A-2 | A-3 | A-4 | A-5 | A-6 | A-7 | A-8 | A-9 |
| Cell form | R | R | R | R | R | R | R | R | R |
| Gram's stain | − | − | − | − | − | − | − | − | − |
| Flagellation | Po | − | Po | − | − | − | Po | Po | − |
| H.L. test | NA | NA | F | F | NA | NA | NA | O | NA |
| Sensitivity to 0/129 | − | − | + | − | − | − | − | − | − |
| Pigmentation | | | | | Y | Or | | | Y |
| Catalase | + | + | + | + | + | + | + | + | + |
| Oxidase | + | + | + | − | − | − | + | + | − |
| Indole production | − | − | + | + | − | − | − | − | − |
| H S production | + | − | + | + | − | − | + | + | − |
| M.R. test | − | − | − | − | − | − | − | − | − |
| V.P. test | − | − | + | + | − | − | − | − | − |
| Growth in 7.5% NaCl | + | + | + | + | + | + | + | + | + |
| Require added NaCl | + | + | + | + | + | + | + | + | − |
| Growth at 37° C. | + | − | + | + | − | − | − | − | − |
| Identification | Ps | M | V | ? | F | F | Ps | Ps | F |

+; positive, −; negative, R; rod, Po; polar, O; oxidative, NA; no acid, F; fermentative, Y; yellow, Or; orange, Ps; Pseudomonas, F; Flavobacterium, V; Vibrio, M; Moraxella, ?; not identified These bacteria collected from the surface all belonged to the gram-negative rod-shaped bacteria and were microbiologically identified that the T-1, T-2, T-3, T-5 and T-8 obtened from the titanium plate and the A-1, A-7 and A-8 obtained from the aluminum alloy plate belonged to Pseudomonas, T-6, T-7, T-9, T-10 and A-3 belonged to Vibrio and T-4, A-5, A-6 and A-9 belonged to Flavobacterium. Each species of these bacteria excepting A-9 obtained from the aluminum alloy plate required sodium chloride in the culture medium for the optimum proliferation so that they are considered to be oceanic or halophilic bacteria. It was noted that a large part of the bacteria obtained from the titanium plate were motile while a relatively large part of the bacteria obtained from the aluminum alloy plate were nonmotile.

In the next place, a sea water culture medium in a volume of 100 ml containing 2.5% by weight of polypeptone and 0.5% by weight of yeast extract was inoculated with each species of the isolated bacteria and culturing was performed with shaking at 25° C. for about 4 hours followed by the addition of about 400 ml of a sea water presumedly containing the bacteriophages to continue culture for additional 24 hours followed by standing for 24 hours. One drop of the supernatant obtained by centrifugal removal of the bacteria and cell debris thereof from the medium was added to an agar double layer inoculated with the respective species of the bacteria and culture was performed overnight at 25° C. The presence of the bacteriophages was concluded when clear plaques were found on the culture medium and the bacteriophages were isolated from the plaques and purified.

In this manner, 13 species of bacteriophages could be isolated. Table 2 below gives the relationship between each of the thus isolated bacteriophage species and the host bacteria.

TABLE 2

| Strain | Bacteriophage | | | | | | | | | | | | |
|---|---|---|---|---|---|---|---|---|---|---|---|---|---|
| | pT-1 | pT-2 | pT-3 | pT-5 | pT-6 | pT-7 | pT-8 | pT-10 | pA-1 | pA-2 | pA-3 | pA-4 | pA-7 |
| T-1 | + | − | − | + | − | − | + | − | ± | − | − | − | + |
| T-2 | − | + | − | − | − | − | − | − | − | − | − | − | − |
| T-3 | − | − | + | − | − | − | − | − | − | − | − | − | − |
| T-5 | + | − | − | + | − | − | + | − | − | − | − | − | + |
| T-6 | − | − | − | − | + | − | − | + | − | − | + | − | − |
| T-7 | − | − | − | − | − | + | − | − | − | − | − | − | − |
| T-8 | + | − | − | + | − | − | + | − | − | − | − | − | + |
| T-10 | − | − | − | − | − | − | − | + | − | + | − | − |
| A-1 | − | − | − | − | − | − | − | − | + | − | − | − | − |
| A-2 | − | − | − | − | − | − | − | − | − | + | − | − | − |
| A-3 | − | − | − | − | − | − | − | + | − | − | + | − | − |
| A-4 | − | − | − | − | − | − | − | − | − | − | − | + | − |
| A-7 | + | − | − | + | − | − | + | − | ± | − | − | − | + |

+; clear plaque was formed, ±; turbid plaque was formed, −; plaque was not formed.

EXAMPLE 1

A microbiofouling film of bacteria was formed on a plate of 50 mm by 50 mm by 1 mm dimension made of titanium metal, which is a material used in the heat transfer surface of heat exchangers, by immersing for 36 days in the sea water on the area where the sea water was being taken as the cooling medium of a heat exchanger. A small portion of the microbiofouling film was collected and inoculated on a seawater-agar culture medium containing 0.1% by weight of yeast extract and 0.5% by weight of polypeptone and, after culturing for 12 hours at 25° C., gram-negative rod-shaped bacterium T-5 each having a width of 0.6 μm and a length of 1.2 μm was isolated from the colony formed on the culture medium followed by purification of the bacterium. On the other hand, a sea sludge containing bacteriophage capable of lysing the above isolated bacterium was collected from the same sea area where the bacterium had been obtained and the bacteriophage pT-5 was isolated according to a conventional procedure for the testing by the plaque formation.

In the next place, the stock of the above isolated bacteria was suspended in a 5 ml portion of sea water containing 0.1% by weight of yeast extract and 0.5% by weight of polypeptone and cultured at 25° C. When the bacteria had multiplied to count a density of $10^7$ cell/ml and the sea water was turbid in white, about $10^6$ particles of the bacteriophages were added to the sea water and culture was continued at 25° C. The turbidity of the sea water was then gradually decreased and it was clear within 30 minutes after the addition of the bacteriophages indicating that the expected lysis took place.

For comparison, culture of the bacteria in the sea water was continued without the addition of the bacteriophages to find that the density of the bacteria was increased to about twice after 30 minutes of the continued culture.

EXAMPLE 2

A stock of gram-negative, rod-shaped bacterium T-7 having a width of 1 μm and a length of 2 μm and a flagellum was isolated from a microbiofouling film formed on a titanium plate in the same manner as in Example 1. Separately, bacteriophage pT-7 capable of lysing the bacterium T-7 was isolated by a conventional procedure for the testing by the plaque formation from the sea water taken in the same sea area where the microbiofouling film had been formed on the titanium plate.

The above isolated bacterial stock was cultured in a 5 ml portion of sea water at 25° C. containing 0.1% by weight of yeast extract and 0.5% by weight of polypeptone and increase in the concentration of the bacteria was successively determined in time by the increase of the absorbance at 660 nm. When the absorbance had increased to 0.5 corresponding to a cell concentration of about $3 \times 10^8$ cell/ml, $3 \times 10^8$ particles of the bacteriophages were added to the sea water and culture was continued by shaking at the same temperature. The increase in the absorbance was terminated at once as the bacteriophages were added and the absorbance began to decrease after 60 minutes reaching 0.3 and 0.16 after 90 minutes and 120 minutes, respectively, indicating the lysis of the bacteria taking place.

In this case, the latent period of the lysis, i.e. the length of time between the moment of first attachment of the bacteriophage to the bacterium and the moment of lysis, was about 30 minutes and the number of the new bacteriophage particles released from a single lysed bacterium was about 100.

For comparison, the same procedure of culture was repeated without the addition of the bacteriophages to find that the absorbance of the sea water had increased to 1.4 and 1.6 after 90 minutes and 120 minutes, respectively, from the moment when the absorbance was 0.5 indicating continued proliferation of the bacteria.

EXAMPLE 3

Into a sea water containing 0.025% by weight of polypeptone and 0.0025% by weight of yeast extract, in which a titanium plate of 50 mm by 50 mm by 1 mm dimensions was immersed, were added the same bacteria and the same bacteriophages as in Example 2 each in a concentration of about $10^7$ cell/ml. The titanium plate taken out of the sea water after 12 hours of immersion was stained with a fluorescent reagent DAPI and the stained surface was examined with a fluorescent microscope. The result was that almost no attachment of the bacteria was found on the surface of the titanium plate.

For comparison, the same procedure as above was repeated excepting the omission of the bacteriophages to find proliferation of the bacteria on the surface. These results clearly support the effectiveness of the inventive method according to which the bacteriophages added to the sea water are effective to lyse the adhered bacteria on the surface and prevent biofouling thereby.

What is claimed is:

1. A method for preventing biofouling of a surface of a solid body continuously in contact with sea water containing bacteria responsible for the biofouling of the surface caused by the attachment of the bacteria to the surface and selected from the group consisting of Pseudomonas, Flavobacterium and Vibrio comprising the steps of:
   (a) adding to sea water coming into contact with the surface, antifouling bacteriophages capable of lysing said bacteria, and in a concentration of $10^4$ tp $10^8$ bacteriophage particles per liter of the sea water to selectively sterilize the sea water of said bacteria responsible for biofouling with proliferation of the antifouling bacteriophages; and
   (b) bringing the thus selectively sterilized sea water containing the antifouling bacteriphages into contact with the surface.

2. A method for preventing biofouling of a surface of a solid body continuously in contact with sea water containing bacteria responsible for the biofouling of the surface caused by the attachment of the bacteria to the surface and selected from the group consisting of Pseudomonas, Flavobacterium and Vibrio comprising the steps of:
   (a) adding to sea water coming into contact with the surface, antifouling bacteriophages capable of lysing said bacteria, and in a concentration of $10^4$ to $10^8$ bacteriophage particles per liter of the sea water to selectively sterilize the sea water of said bacteria responsible for biofouling with proliferation of the antifouling bacteriophages, and
   (b) bringing the thus selectively sterilized sea water containing the antifouling bacteriphages into contact with the surface; and
   (c) recycling at least a part of the sea water after contacting with the surface and adding the same to the sea water to which bacteriophages are added in step (a).

* * * * *